United States Patent [19] [11] 4,424,039
Washburn [45] Jan. 3, 1984

[54] MATHEMATICS TEACHING DEVICE
[76] Inventor: Jack E. Washburn, 22319 W. Meade La., Buckeye, Ariz. 85326
[21] Appl. No.: 428,355
[22] Filed: Sep. 29, 1982
[51] Int. Cl.³ .......................... G09B 19/02; G09B 1/10
[52] U.S. Cl. ....................................... 434/189; 434/191
[58] Field of Search ............... 434/188, 189, 190, 191, 434/200, 205, 207, 208, 210, 172, 430

[56] References Cited
U.S. PATENT DOCUMENTS

| | | | |
|---|---|---|---|
| 189,979 | 4/1877 | Wieser | 434/207 X |
| 1,490,858 | 4/1924 | Seegers | 434/204 |
| 2,304,893 | 12/1942 | Dickson | 434/200 X |
| 2,474,447 | 6/1949 | Wheelock | 434/172 |
| 2,502,238 | 3/1950 | Wade et al. | 434/208 |
| 2,867,045 | 1/1959 | Millgate | 434/430 X |
| 2,946,135 | 7/1960 | Eickmeyer et al. | 434/200 |
| 3,263,347 | 8/1966 | McCutcheon | 434/430 |
| 3,357,116 | 12/1967 | Bazacos | 434/205 X |
| 3,374,558 | 3/1968 | Smith, Jr. | 434/200 |
| 3,430,362 | 3/1969 | Jacobson | 434/200 |
| 3,540,873 | 6/1970 | Stobbe | 434/190 |

FOREIGN PATENT DOCUMENTS

| | | | |
|---|---|---|---|
| 31135 | 10/1933 | Netherlands | 434/210 |
| 5489 | of 1910 | United Kingdom | 434/210 |

Primary Examiner—William H. Grieb
Attorney, Agent, or Firm—Cates & Roediger

[57] ABSTRACT

A mathematics teaching device wherein a display surface is divided into eight regions. The first region contains one hundred colored and numbered plaques removably mounted in ten rows. Plaques are within five color groupings and the rows are color-coded as are receiving pockets. Two regions have another set of plaques with an adjacent receiving pocket to permit simple mathematical operations to be performed therein. The other regions are marked for additional operations to be performed therein.

12 Claims, 3 Drawing Figures

MATHEMATICS TEACHING DEVICE

BACKGROUND OF THE INVENTION

The initial introduction to mathematics often determines a student's interest and abilities in this area of study for the remainder of his life. The traditional use of passive learning techniques such as the observation of a teacher's demonstration as an introduction to a student's later independently performing the desired operations on his own paper does not always take the student to the point where independent work can be effectively handled. Thus, a device which can enable the student to more quickly grasp the nature of simple arithmetic operations including the elementary steps of counting, numerical sequencing, number grouping according to different bases, and the meaning of inequality between numbers is desirable.

Several board games or number arrays have been utilized in the past to assist in teaching basic number familiarity. Typically these arrays have been limited to the basic counting process or have been designed for assistance in teaching multiplication. The need has arisen for a teaching device serving to promote not only number familiarity and the theory behind the sequences of numbers but also to provide the means for the performance of simple arithmetic tasks such as addition and subtraction.

The present invention is directed to the provision of a teaching aid wherein the young beginner can observe the number order, then count by one, two, five or ten increments. And without leaving his workplace, he can demonstrate knowledge of the relative values of different numbers and test his familiarity with the subject by performing addition and subtraction thereon. The hands-on approach to these arithmetic operations both enhances the child's learning process and assists the teacher in bridging the gap from passive instruction to independent performance of arithmetic operations.

SUMMARY OF THE INVENTION

This invention relates to a mathematics teaching device wherein a display surface is divided into a number of regions each of which is adapted for the performance of a particular arithmetic task therein by the student user.

The first region contains a large number of consecutively numbered and color-coded plaques removably mounted thereon. The mountings for the plaques are organized in rows of ten with each of the plaques in a pair of adjacent rows being marked with the same color. The color code changes after every two rows and normally there are five colors for a total of one hundred number plaques. Adjacent each row is a color code marker so that the student, by reference to the color marker, is readily guided to the two rows which receive a particular plaque. The mountings are arranged in a columnar form so that assistance is provided in placement by referring to the last digit on the plaque and comparing it with vertically adjacent plaques.

A number of individual receiving pockets are provided in the lower peripheral portion of the display surface to receive plaques as they are removed by the student and to retain them for later placement at desired locations on the board. To facilitate handling by a student initially familiarizing himself with the number system, each receiving pocket is color-coded to a particular subdivision of plaques. Thus, the task of reordering the plaques within the first region is greatly simplified by the color coding of plaque subdivisions, row pairs and receiving pockets.

The second and third regions are positioned adjacent the first region. These regions are marked to indicate the placement of plaques for the carrying out of addition and subtraction. Proximate to these two regions is a receiving pocket containing its own numbered plaques color-coded to correspond with color-coding of a particular subdivision of the first collection, typically the subdivision including single digit numbers. Three additional regions are provided to demonstrate counting by the bases two, five and ten. Also, two small regions are adjacently located on the display surface to demonstrate the inequality of numbers.

The present invention provides the student with the ability to learn basic number sequences, groupings, counting, inequalities and the performance of simple arithmetic operations by the combination of the subdivision of the display surface, the location of the receiving pockets, the color-coding of rows, plaques and pockets and the provision of the additional plaques for addition and subtraction. Further features and advantages of the invention will become more readily apparent from the following detailed description of a preferred embodiment when taken in conjunction with the accompanying drawings.

DESCRIPTION OF THE PREFERRED EMBODIMENT

Figure 1:
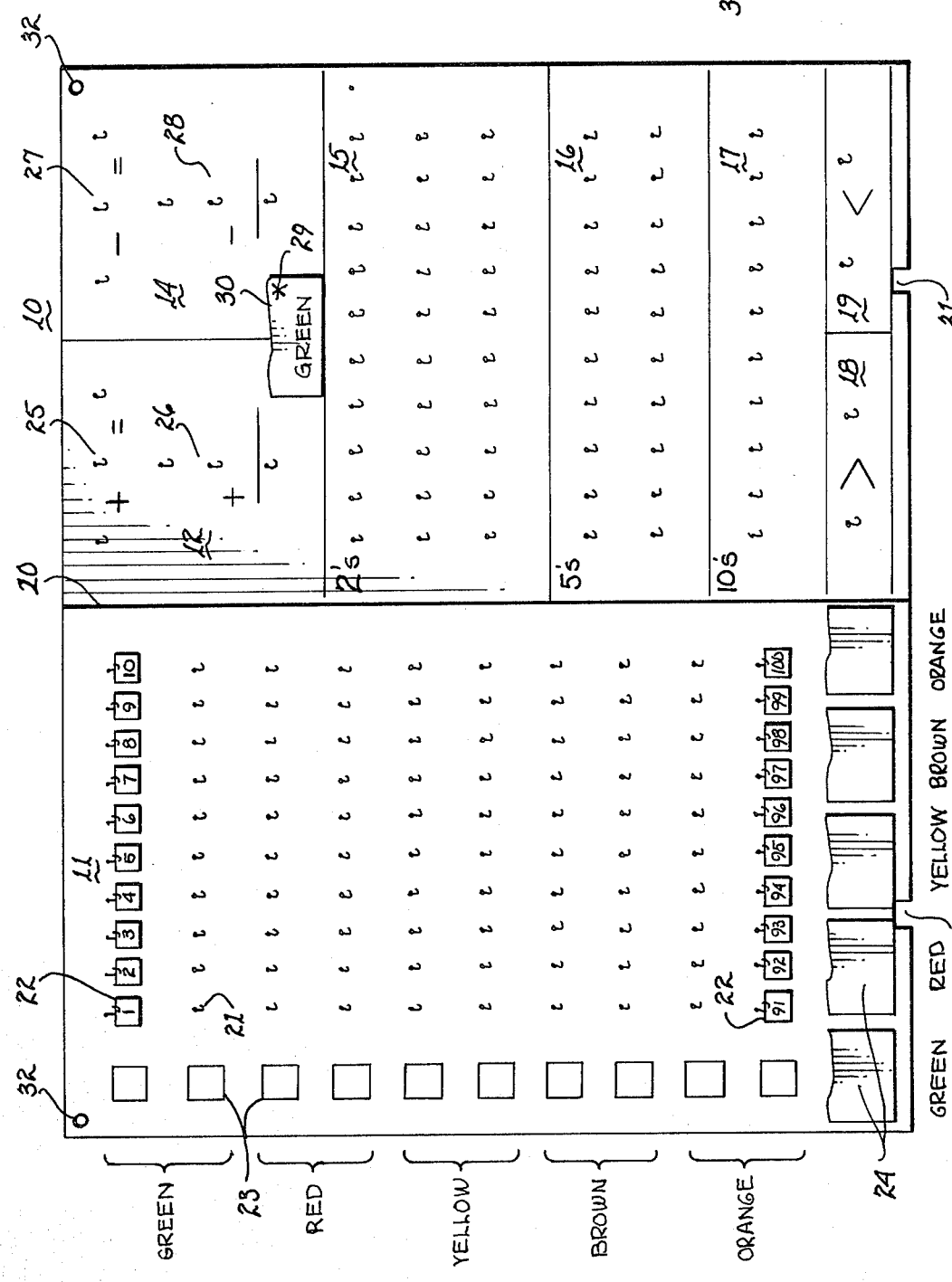
FIG. 1 is a front view of the display surface of one embodiment of the invention.

Referring now to FIG. 1, the display surface 10 of the present invention is shown generally rectangular in shape and may be formed of any rigid durable material suitable for use in a classroom environment of young children.

The display surface is divided by center line 20 into a primary working region wherein a student initiates his activities. The primary region contains one hundred hooks 21, preferably with rounded tips, affixed thereto in 10 rows and 10 columns each containing 10 hooks. The device includes one hundred color-coded consecutively numbered plaques 22. The first and last rows are shown with the plaques in place and in normal order.

The plaques are grouped into five subdivisions with each subdivision having a different color. The location of each subdivision on two adjacent rows of hooks is denoted by the color-coded patches 23 located in a vertical array adjacent the rows of hooks. A typical color scheme is set forth in FIG. 1 although a variety of different schemes may be used, if desired.

Beneath the rows of hooks in the first region 11 are a number of pockets 24 for receiving plaques removed from the hooks of the first region. Each pocket is color-coded to a particular two row subdivision of plaques and the student is instructed to place them in the corresponding pocket when removing them from the first region. This first region is the starting point for introducing the student to number sequencing and grouping as well as serving as the reservoir of numbers for use in arithmetic operations taking place in other regions of the display surface.

Second region 12 is located just to the right of center line 20 and is shown including hooks arrayed in a single row and a separate single column along with the marking necessary to indicate the algebraic approach to addition 25 and the arithmetic approach to addition 26. Similarly, third region 14 contains six hooks arrayed in a single row and a single column to provide the algebraic pattern 27 and the arithmetic pattern 28 of subtraction. A separate receiving pocket 30 is mounted on the display board and contains the additional numbered plaques 0 through 10 to enable the student to complete the addition and subtraction of single digit numbers.

The numbered plaques in pocket 30 are color-coded with the same color used for the first subdivision of plaques which corresponds to the color-code of the first two rows of hooks in region 11. In addition, these additional plaques and pocket 30 are provided with an identifying mark shown in FIG. 1 on pocket 30 as a star to aid the student in returning the plaques to the appropriate locations after completing a task.

Region 15 is characterized by the legend 2's and includes three rows of ten hooks each. Regions 16 and 17 denoted 5's and 10's are provided with two rows and one row of ten hooks each as shown. These three regions enable the student to transfer plaques from the first region to these regions to utilize a different counting system with a different base. In the lower portion of the display surface are regions 18 and 19 each of which contains two hooks and the different inequality symbols as shown.

Figure 2:
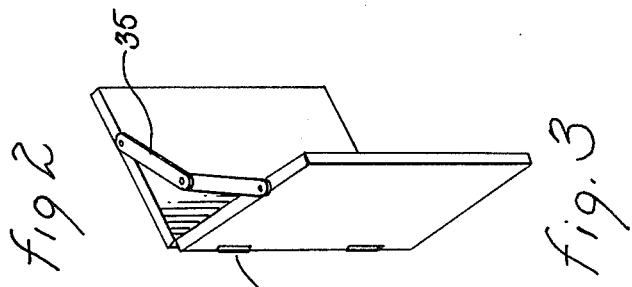
FIG. 2 is a perspective view in outline of two embodiments of the invention showing means for vertical support of said embodiments.
Figure 3:
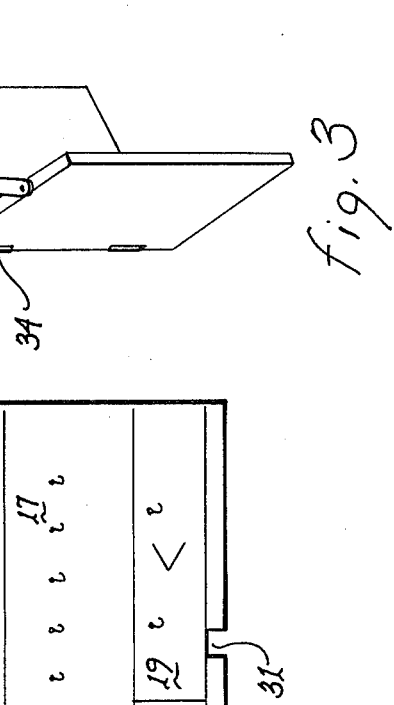
FIG. 3 is a perspective view in outline of a bifurcated embodiment of the invention.

The display board of FIG. 1 is shown provided with holes 32 located at the opposing upper corners to facilitate suspending the display board from a classroom wall. In addition, the lower edge may be provided with two spaced notches 31 to accommodate basal support members as shown in FIG. 2 to enable the teaching aid to be utilized at a student's workplace remote from distractions and peer pressure. It is to be noted from FIG. 2 that two teaching aids are used in a back-to-back configuration, however single member basal supports can be used, if desired. While the teaching device is shown with a display surface on one side thereof it is to be recognized that double-sided embodiments can also be provided. The embodiment of FIG. 3 is adapted for storage by the provision of a vertical hinge 34 along center line 20 along with retaining member 35 which limits the direction of opening to prevent damage to the hinge by the students.

The sequence of utilization of the teaching device which is the subject of the present invention begins with the children gaining familiarity with number sequences and groupings through the withdrawal of plaques from selected pockets and with the guidance of the color-coding adjacent the subdivisions. After the ordering and grouping is understood, simple arithmetic operations utilizing the auxiliary supply of plaques from pocket 30 are initiated. The operations with addends and subtrahends of 2 and 5 can lead to the use of the counting by the regions marked for counting by 2's and 5's while the color-coding and the columns of the first region aid in the counting by 10's. After these operations are understood, the student proceeds to the understanding of inequalities through the use of the lower regions of the teaching aid.

While the above description has referred to specific embodiments of the invention it is recognized that many variations and modifications may be made therein without departing from the scope of the invention claimed.

What is claimed is:

1. A mathematics teaching device comprising:
   (a) a display surface, said surface being divided into a number of regions;
   (b) a first collection of numbered colored plaques, said plaques being grouped into subdivisions, each of a different color;
   (c) a multiplicity of receiving means affixed to said display surface for removably receiving said plaques on said display surface;
      (i) a first portion of said receiving means being mounted in rows and columns in a first region of said display surface, the number of said receiving means within said first region being equal to the number of plaques in said first collection;
      (ii) a second portion of said receiving mans being mounted in a second region of said display device to facilitate the performance of arithmetic operations thereon;
   (d) a second collection of numbered colored plaques;
   (e) container means affixed to said display surface proximate to said second region for removably receiving said second collection of plaques;
   (f) a number of color-coded receiving means attached to said display surface for removably receiving plaques of said first collection, the number of said receiving means being equal to the number of subdivisions in said first collection.

2. The device of claim 1 wherein said second collection of plaques and said containers are provided with the same color-coding.

3. The device of claim 2 wherein said multiplicity of receiving means further comprises a third portion thereof being mounted in a third region of said display device adjacent said second region to facilitate the performance of arithmetic operations thereon.

4. The device of claim 3 wherein the receiving means mounted in said second and third regions are mounted in a row and a column within each said region.

5. The device of claim 4 wherein said multiplicity of receiving means further comprises an additional portion mounted in at least one additional region having a row of receiving means therein to facilitate the performance of arithmetic operations thereon.

6. The device of claim 5 wherein said display surface contains two adjacent small regions each having two spaced receiving means therein, each of said regions containing an arithmetic marking therebetween.

7. The device of claim 6 further comprising color-coding means mounted within said first region proximate to selected rows of receiving means therein.

8. The device of claim 7 wherein said first collection of plaques is grouped into five equal subdivisions in ascending numerical order and a color-coded receiving means is provided for each subdivision.

9. The device of claim 8 wherein said second collection of plaques is the same color as one of said subdivisions.

10. The device of claim 9 wherein said display surface is divided into at least eight regions for the performance of arithmetic operations therein.

11. The device of claim 10 wherein said display surface is formed of two portions and further comprises hinge means coupled between said portions for enabling the device to be folded for transport.

12. The device of claim 10 further comprising support means for engaging the bottom peripheral portion of said display surface and permitting said device to remain in a vertical position.

* * * * *